(12) United States Patent
Kroll (10) Patent No.: US 6,405,922 B1
(45) Date of Patent: *Jun. 18, 2002

(54) KEYBOARD SIGNATURE SECURITY SYSTEM

(75) Inventor: Mark W. Kroll, Simi Valley, CA (US)

(73) Assignee: Kroll Family Trust, Simi Valley, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 09/571,980

(22) Filed: May 15, 2000

Related U.S. Application Data (63) Continuation-in-part of application No. 08/942,820, filed on Oct. 2, 1997, now Pat. No. 6,062,474.

(51) Int. Cl.[7] .............................................. G06F 17/60
(52) U.S. Cl. ....................................... 235/379; 235/383
(58) Field of Search ................................. 235/379, 383

(56) References Cited

U.S. PATENT DOCUMENTS

| | | | |
|---|---|---|---|
| 3,896,266 A | 7/1975 | Waterbury | 179/15 B |
| 4,592,086 A | 5/1986 | Watari et al. | 381/43 |
| 4,621,334 A | 11/1986 | Garcia | 364/550 |
| 4,736,445 A | 4/1988 | Gundersen | 382/3 |
| 4,805,222 A | 2/1989 | Young et al. | 382/2 |
| 5,193,114 A | 3/1993 | Moseley | 380/24 |
| 5,386,104 A | 1/1995 | Sime | 235/379 |
| 5,557,686 A | 9/1996 | Brown et al. | 382/115 |
| 5,594,806 A | 1/1997 | Colbert | 382/115 |
| 5,721,765 A | 2/1998 | Smith | 379/93.03 |
| 5,764,789 A | 6/1998 | Pare, Jr. et al. | 382/115 |
| 5,790,935 A | 8/1998 | Payton | 455/5.1 |
| 5,868,669 A | 2/1999 | Iliff | 600/300 |
| 5,912,974 A | 6/1999 | Holloway et al. | 380/51 |
| 6,029,144 A | * 2/2000 | Barrett et al. | 235/375 |
| 6,092,725 A | * 7/2000 | Swartz et al. | 235/383 |
| 6,149,055 A | * 11/2000 | Gatto | 235/379 |

\* cited by examiner

*Primary Examiner*—Michael G. Lee
*Assistant Examiner*—Seung Ho Lee (57) ABSTRACT

A method is taught for analyzing the keystroke signature of a keyboard customer. The signature is compared to a database of previously stored keystroke sequences to allow for a statistical test for the identity of the user. This method allows for the use of varying keyboards to facilitate electronic commerce over the Internet from arbitrary terminals and personal computers.

17 Claims, 12 Drawing Sheets

| | C | h | a | s | e | K | r | o | l | l | |
|---|---|---|---|---|---|---|---|---|---|---|---|
| | TB | KD | TB | KD | TB | KD | TB | KD | TB | KD | TB | KD | TB | KD | TB | KD | TB | KD | TB | KD |

| | TB | KD | TB | KD | TB | KD | TB | KD | TB | KD | TB | KD | TB | KD | TB | KD | TB | KD | TB | KD |
|---|---|---|---|---|---|---|---|---|---|---|---|---|---|---|---|---|---|---|---|---|
| Maximum | 3545 | 115 | 485 | 79 | 441 | 138 | 265 | 160 | 291 | 115 | 2596 | 98 | 204 | 113 | 239 | 97 | 255 | 86 | 187 | 70 |
| Average | 2235 | 97 | 289 | 70 | 272 | 115 | 246 | 137 | 271 | 96 | 2003 | 86 | 184 | 102 | 169 | 84 | 220 | 69 | 169 | 60 |
| Minimum | 1417 | 84 | 188 | 63 | 170 | 91 | 230 | 124 | 230 | 80 | 1392 | 78 | 170 | 87 | 120 | 69 | 196 | 47 | 145 | 47 |

KEYBOARD SIGNATURE SECURITY SYSTEM

This is a continuation-in-part of Ser. No. 08/942,820 entitled "ATM Signature Security System" filed Oct. 2, 1997 issuing as U.S. Pat. No. 6,062,474.

BACKGROUND OF THE INVENTION

Electronic commerce is primarily done in three fashions. The first uses specialized keyboards (e.g. ATMs), the second uses computers (usually with an Internet connection) and the third is with a telephone keypad.

Automatic Teller Machines (ATMs) are a wonderful convenience for bank customers. Unfortunately they are also a significant convenience for street criminals. Many street criminals stake out ATM locations. They will then wait until the cash machine is visited by a single vulnerable customer. They will then confront the customer with a weapon or threat and demand that the customer withdraw the maximum amount of cash available.

In many other instances, home invasion burglars and rapists have taken cash cards and used intimidation and violence to extract the PIN number from the customer.

Through other means criminals, often not violent, will come across someone's PIN number and a cash or credit card. This is many times done simply because the customer had the PIN number written in an insufficiently covert means in a wallet or a purse.

What is needed is a means to go beyond the PIN number to ensure that only the appropriate individual is in fact using the ATM. Colbert (U.S. Pat. No. 5,594,806) teaches a computer camera analysis of the knuckles of the customer as a type of simplified fingerprint scheme. This would still not protect the customer who is being forced to make a cash withdrawal under duress. What is needed is a system that would refuse to cooperate with a cash withdrawal when the appropriate customer is under extreme duress and/or the ATM operator is in fact not the appropriate customer.

Similarly there is a need to better identify a customer transacting business over the Internet. Passwords and credit card numbers are often stolen and compromised. Also, it is difficult for customers to remember all of the passwords which are required for their various Internet vendors. Finally, better security is needed for telephone based E-commerce.

DETAIL DESCRIPTION OF THE DRAWINGS AND SUMMARY OF THE INVENTION

Figure 1:
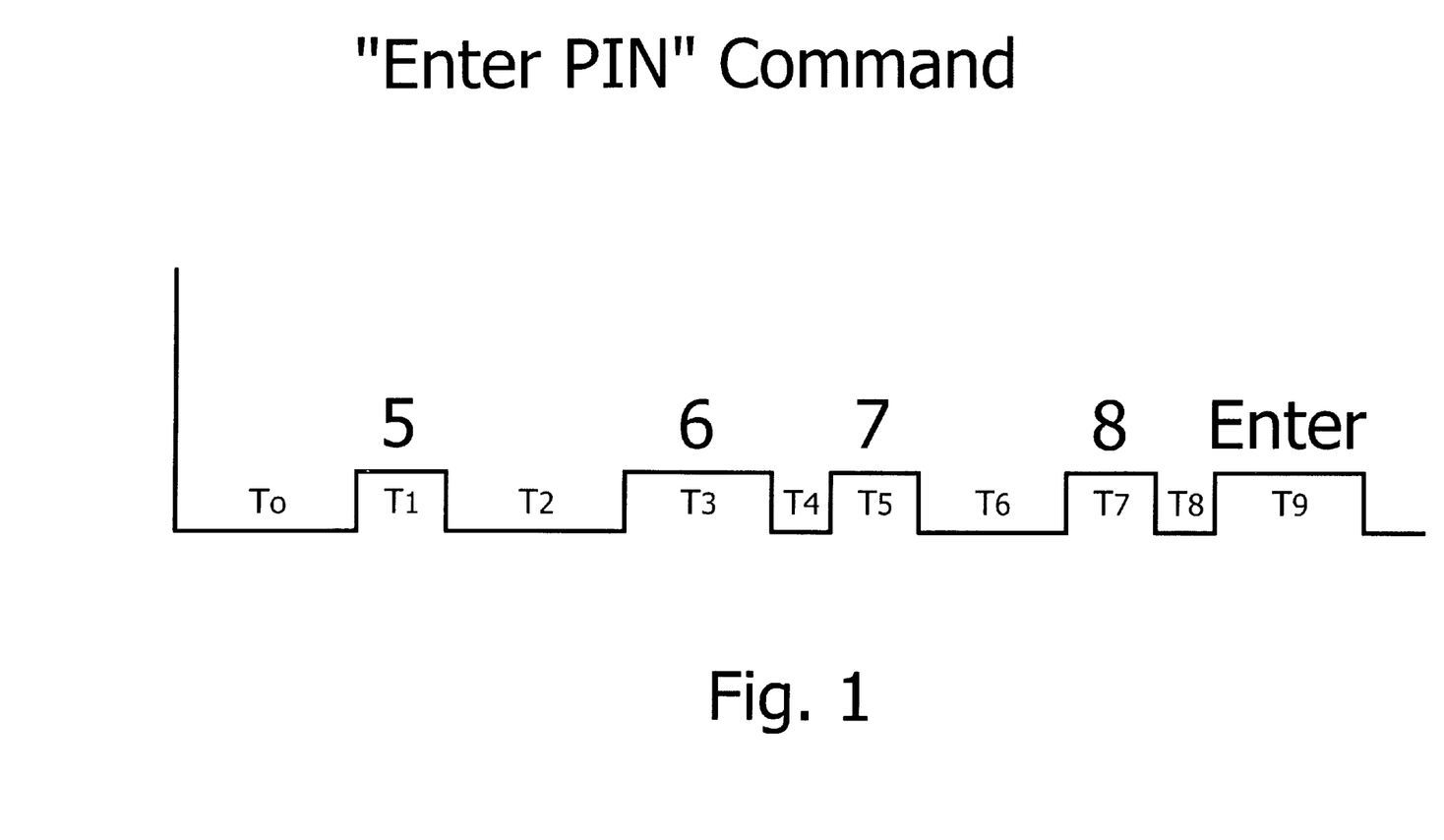
FIG. 1 shows a keyboard signature of a customer entering a PIN number.

FIG. 1 shows the keyboard signature that is generated when a customer enters a PIN number. In this example the PIN number is 5678. There are a total of 10 unique times associated with this entry. There is the first time (which is $T_0$) or the time after the "enter PIN" command is given by the ATM until the customer enters the first digit of the PIN.

The next time is $T_1$ is the time that the button is held down to enter the "5" for the first digit of the PIN.

These times are then generated throughout the entry of the PIN number ending with time $T_8$ (the space between the release of the last PIN digit and the depression of the "Enter" or "OK" key) and finally, the duration of the keypress of the "Enter" key is $T_9$ which signifies the completion of the PIN code.

Many other numbers can be used to generate a keyboard signature on a ATM. For example the delay from the command "Enter Type of Transaction" to the actual depression of the appropriate key and the duration of the depression of that key is another component to an "ATM's signature. The delay from the commands "Select Account" to the actual account selection and the duration of the time of the depression of the account selection button is another signature.

A signature can be built around the numeric entry of the desired amount of cash although this presents complications in that the amount of cash may vary between transactions and thus is not used as the preferred embodiment.

Figure 2:
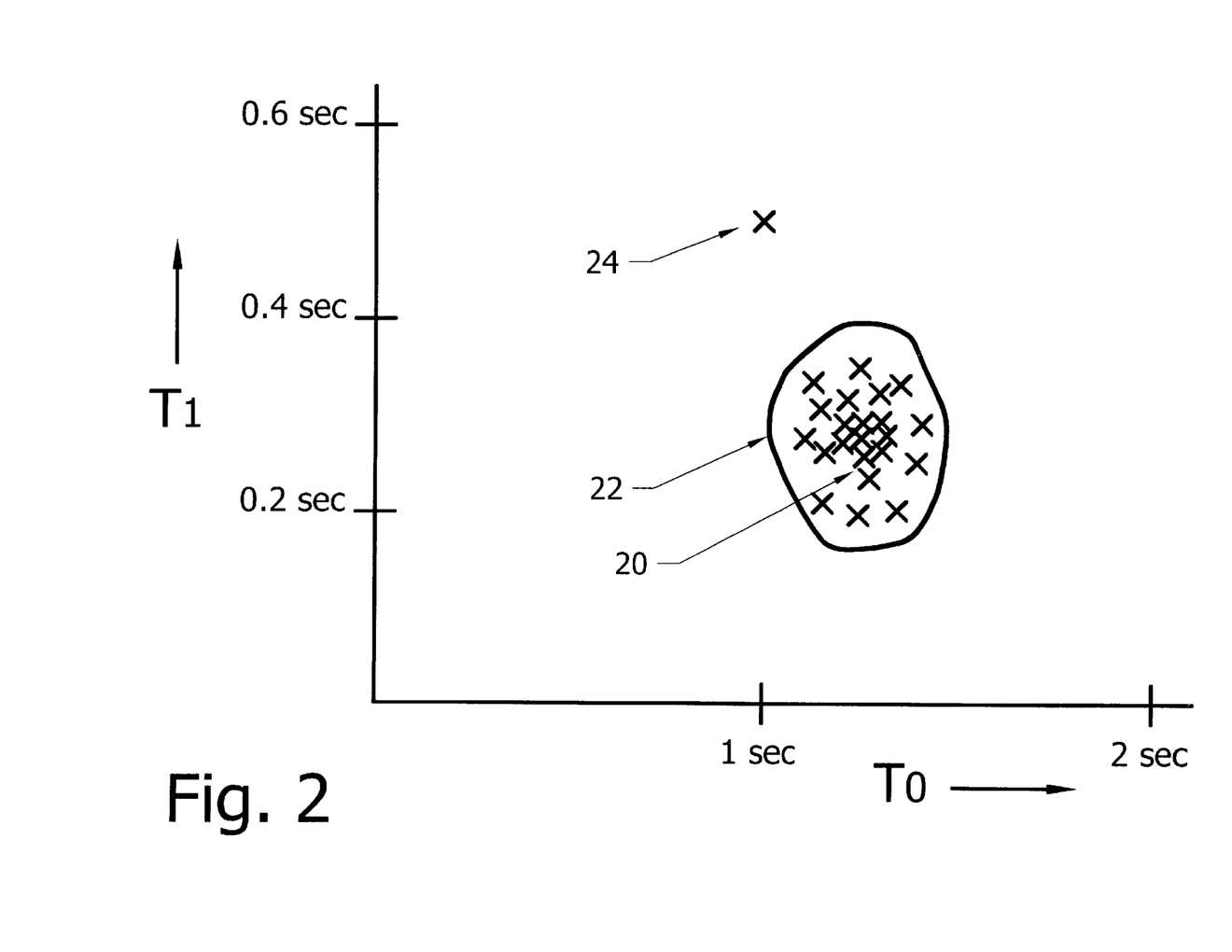
FIG. 2 shows a Cartesian map of a 2 item signature.

Proceeding with the preferred embodiment of transmitting a 10 unit vector for the keyboard signature, we will consider a simplified version of the analysis of the signature as shown in FIG. 2. For simplicity we will simply analyze a two component signature. This also aids in visualization as this can be done on a two dimensional drawing. In this case the two component signature comprises the time $T_0$ and $T_1$ from FIG. 1. The points in the set 20 shows that this operator typically has a $T_0$ time of 1 to 1.3 seconds (recall that this represents a delay from the Enter Pin command to the entry of the first PIN digit).

Similarly this set shows that this operator typically holds down the switch for the first digit of the PIN for about 0.2 to 0.4 seconds. Note that the dispersion in $T_0$ is greater than the dispersion in $T_1$. This is not a problem with the robust statistical techniques that can be used to classify such signatures.

A number of techniques can be used to construct an acceptance set. In this case the boundary shown as curve 22 represent the limit of acceptance for this customers "signature." An entry 24 which signifies a $T_0$ time of 1 second and a $T_1$ time of 0.5 seconds is shown as the X. This entry is out of the acceptance region and thus would be rejected.

The extensions of this approach to ten dimensional space for using the vector shown in FIG. 1 are easily accomplished by anyone skilled in the art of statistics, signal processing, or detection theory. The construction of the boundary 22 can be done a number of ways. One way is to simply take each individual time and construct a mean and standard deviation for that time. The limits then for that time are the mean plus or minus three standard deviations for that individual time component. This gives an acceptance region which is higher dimensional analog of a rectangle. Other techniques can give useful shapes including ellipsoids and tiled surfaces.

The statistical analysis method could also use a neural net in which all of the "time" numbers were fed in and a decision was made on the basis of the neural net response.

Figure 3:
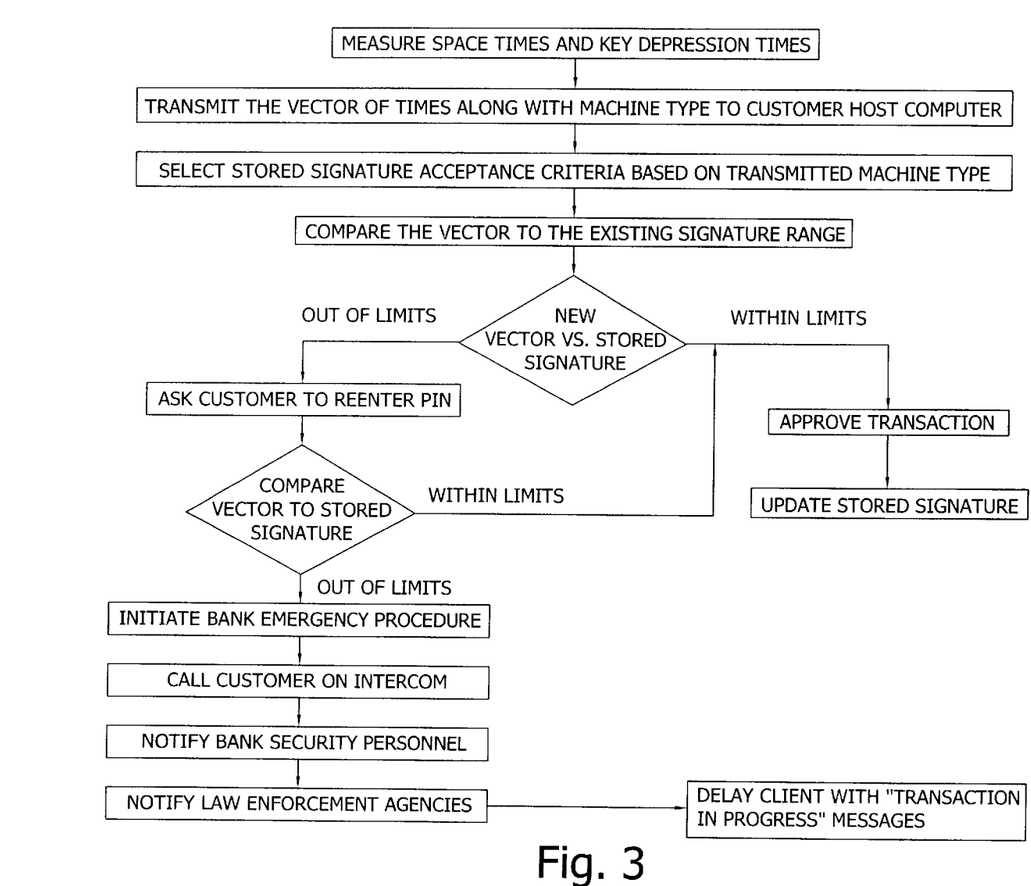
FIG. 3 shows a flow chart of the basic method of the invention.

FIG. 3 shows the flow chart of the basic method of this invention. The method first measures the space times and key depression times as shown in FIG. 1. The method then transmits the vector of these times along with the machine type to the customer's host computer. This refers to the bank or credit card agency that issued the card. The machine type is also required to be transmitted as different types of machines and keyboards will change the client's signature. A new type of machine which the customer is not familiar with will also delay keystrokes and thus to make a valid comparison between the signature for one type of machine with the signature for another type of machine requires some sophistication and will be discussed later.

For example, it is conceivable that the customer may have an accepted signature limit for 3 different types of machines and be building the statistical model for another two machines that the customer rarely uses.

The next step is to compare the transmitted vector to the existing signature range. If the new transmitted vector (after being compared to the storage signature) is found to be within limits then the transaction is approved and the new transmitted signature is used to update the stored signature which will change very slightly with each new entry. This allows the stored signature to track the aging or change of a customers habits.

If, however, the transmitted signature is found to be out of limits then there is a possibility that the customer is under duress or someone has made an unauthorized use of the customer's card and PIN. But, it may also be the case that the customer was merely sloppy in the first attempt. Thus the method then asks the customer to re-enter the PIN. A comparison is then again made. If the comparison is within limits now then the transaction proceeds normally. If the comparison shows that the new transmitted signature is still out of limits then the system immediately initiates a bank emergency procedure. This could involve calling the customer on an intercom system, notifying bank security personnel, or even notifying local law enforcement agencies.

While this emergency procedure is initiated the system may delay the client with innocuous "Transaction in Progress" messages. This is designed to minimize the information given to a possible criminal and to minimize the potential aggravation and provocation to a possible violent criminal.

This invention can also be applied to the use of the full credit card or checking account number. The requirement for the client to type in many more numbers as apposed to just the PIN gives more opportunities for an accurate signature comparison. Of course, the use of the name is extremely helpful as seen in the following examples.

Figure 4:
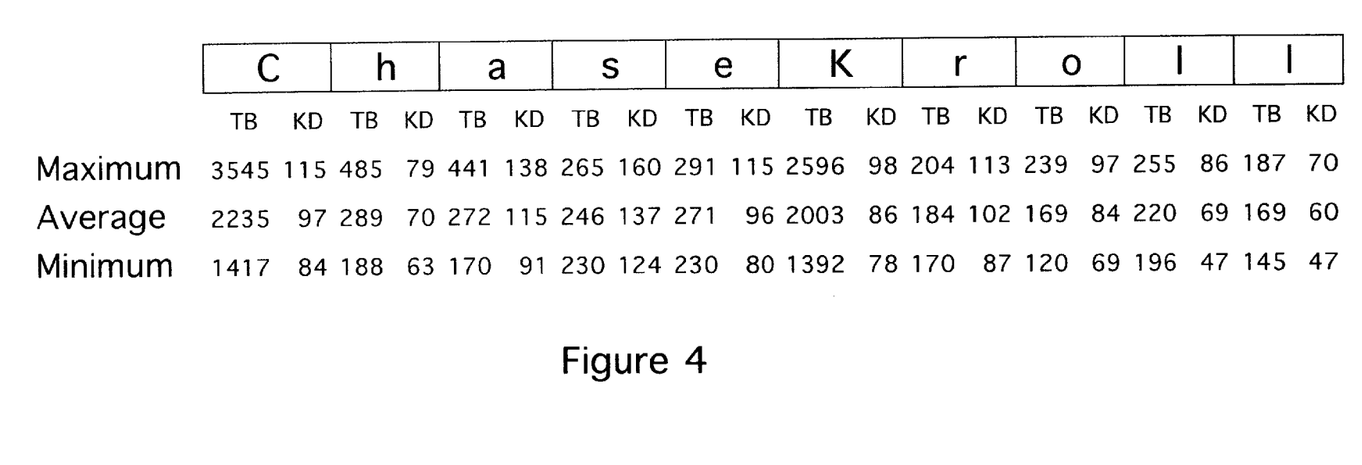
FIGS. 4, 5, and 6 depict a sample keyboard signature using a client's first and last name.

FIG. 4 shows a chart of the actual keyboard timings of a test subject. For each letter there is the time between keystrokes (TB) and the key down time (KD). The chart gives the maximum, average, and minimum for each value.

Figure 5:
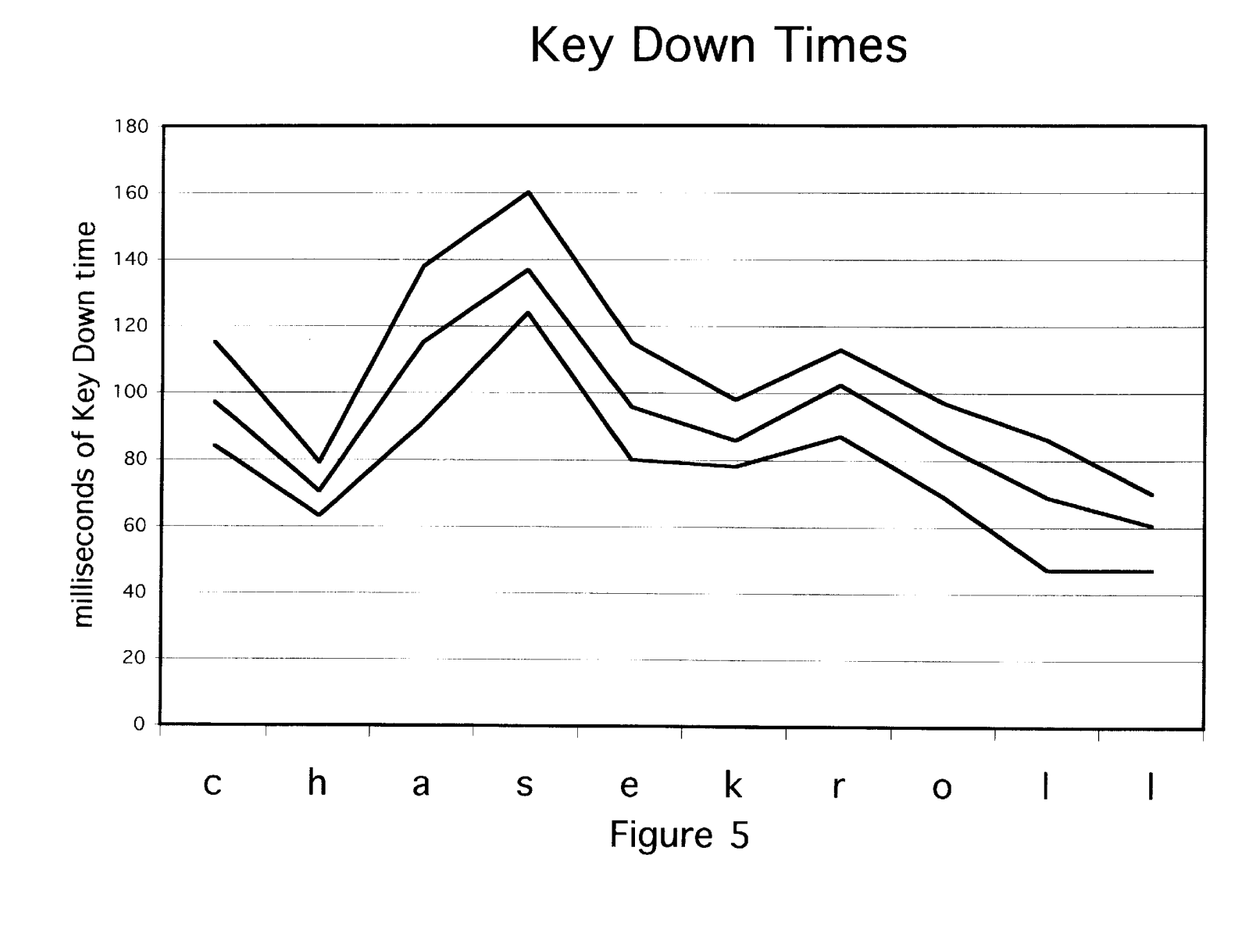

FIG. 5 is a graph of the key down times for the same subject. The graph lines are (from top to bottom) the maximum, average, and minimum values for the key down times for each letter in the subject's name. Note the tight bands for the timings. Note the differences between the letters. For example, this subject held the "s" key down from 124 to 160 ms but held down the "1" key only 47 to 86 ms.

Figure 6:
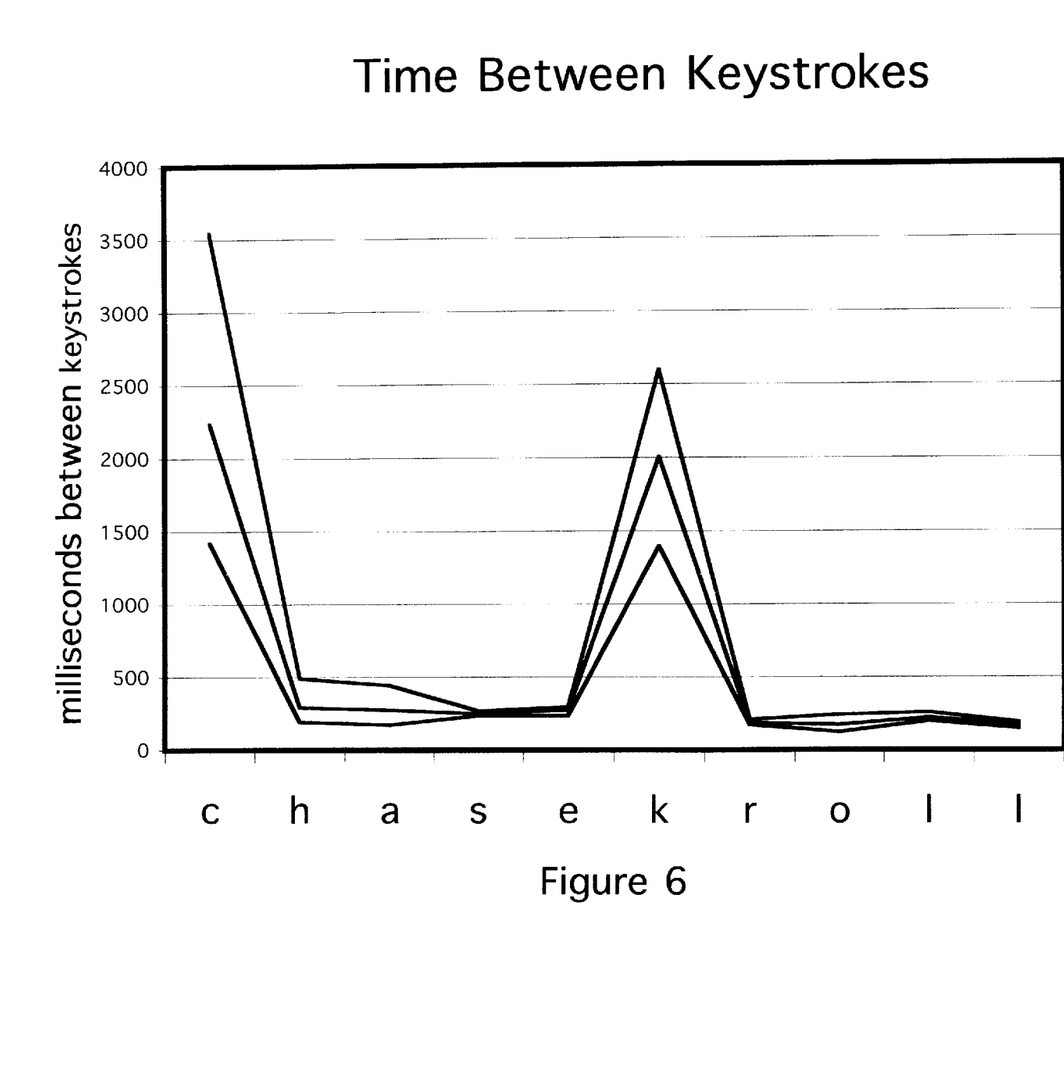

FIG. 6 is a graph of the time between keystrokes for the same subject. The graph lines are (from top to bottom) the maximum, average, and minimum values for each letter in the subject's name. Note the tight bands for the timings except for the start of each name (first and surname). This was due to the experimental setup which had the two names entered in two different boxes and required a "tab" key depression between the two names.

Figure 7:
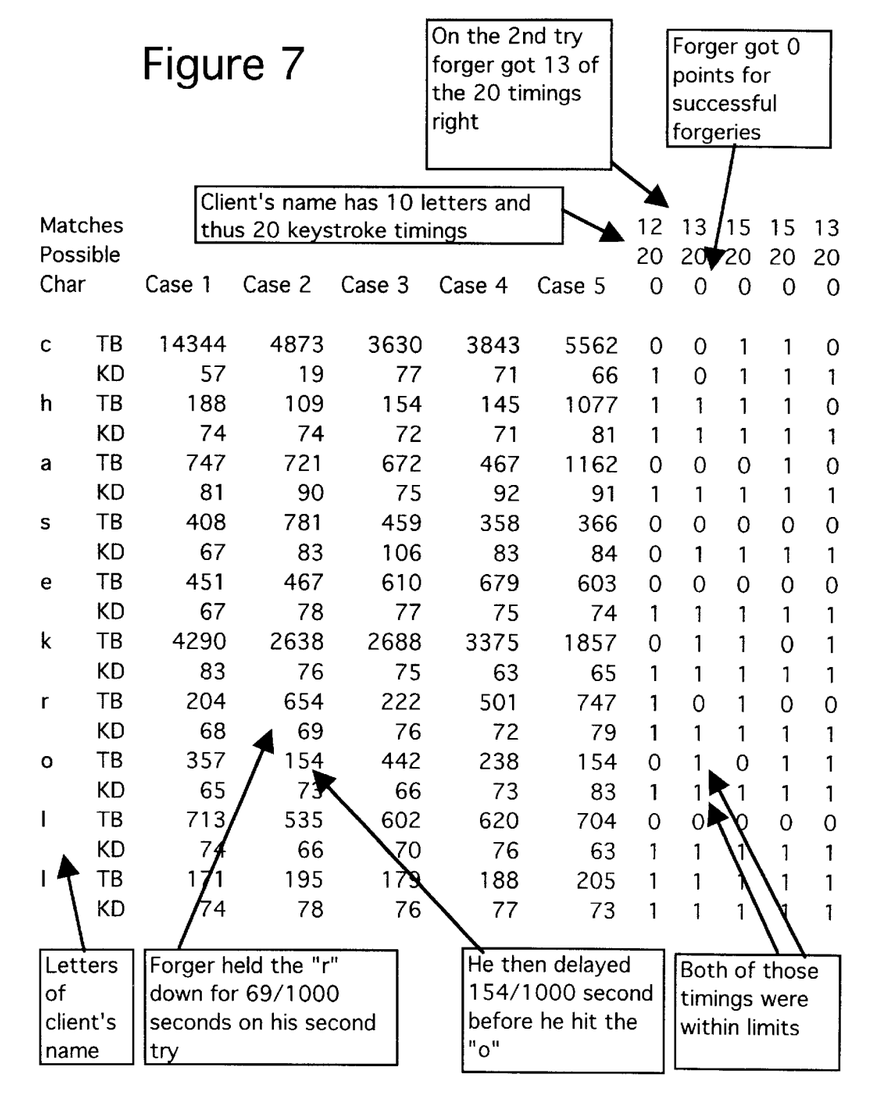
FIG. 7 shows an unsuccessful forgery attempt.

FIG. 7 depicts an unsuccessful forgery attempt. The forger, using the same keyboard was unable to match more than 15 of the 20 timing criteria in 5 attempts. In this test the criterion for each timing was that it must be less than the client's training maximum plus 5% of the average and must be greater that the minimum less 5% of the average.

With the typical small ATM machine or cash register credit card acceptance customer site there is a opportunity to use the card swiping information for further identification. Card swiping here refers to the customer sliding a transaction card such as a credit card or an ATM card through a magnetic stripe reader. This is because everyone swipes a card through a card swiper a little differently; some are very aggressive and steady, some are unsteady, some are slower, some speed up towards the end, and some slow down towards the end.

Figure 8:
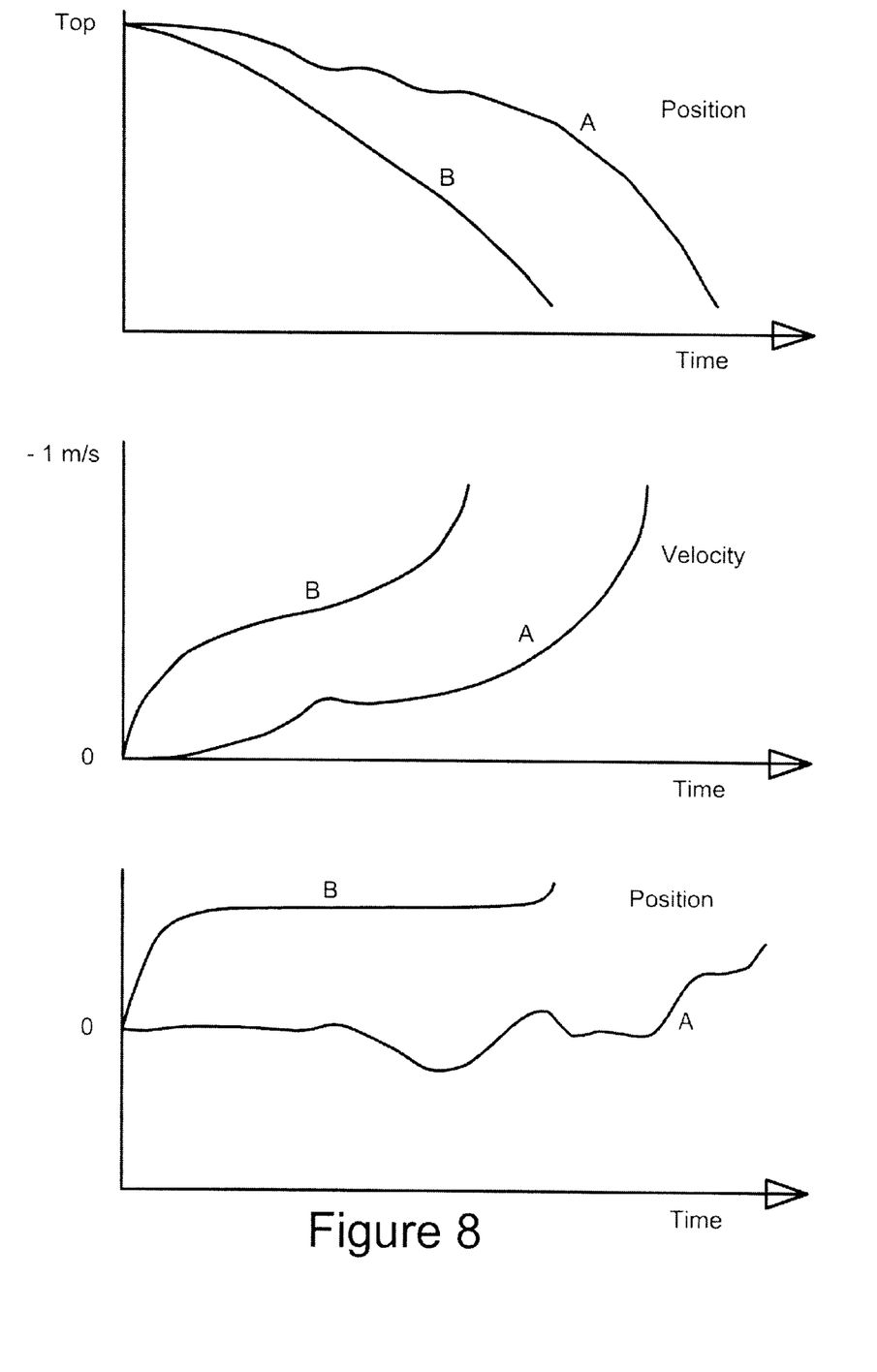
FIG. 8 shows a card swipe profile.

FIG. 8 shows the three basic signals that can be derived from the card swipe: position, velocity, and acceleration. FIG. 8a depicts a customer, "A" swiping a card from top to bottom at a fairly leisurely speed. In contrast, customer "B" swipes a card more rapidly with a steady speed and is done in significantly less time. FIG. 8b shows the velocity which is derived from the position signal by calculating the change of position for each period of time and there the profiles are now more distinct. Finally, the acceleration profiles shown in FIG. 8c have a very significant difference between customers A and B.

These signatures are stored and compared to help establish the customer identification. The other concepts of this invention apply very well to the approach of using the card swipe profile. For example, the transmission of the keyboard type idea applies to the transmission of the type of card swiper.

In another embodiment of the invention other information on the transaction is used to further establish the identity of the client. For example the day of the week and the time of the transaction are also input into the decision apparatus. The distance of the ATM or other keyboard from the client's home is also factored into the decision. For example, a transaction at 3:00 am 500 miles from the client's home would be suspect if the client's normal ATM transactions are always done at 6:00 PM Friday night on the way home from work at a machine that is 8 miles from home. This type of decision making can be automated with a neural net using techniques well known in the art.

When signatures of various types are rejected, they will also be stored for later analysis. That is because these signatures can be used to "fingerprint" criminal behavior. For example, if a certain client's ATM account has received a number of false signatures or fraudulent transaction attempts, then these fraudulent keyboard signatures will be stored. They will then be matched with other signature match failures. The bank or E-commerce company can then match these with other fraudulent attempts. If a pattern is noticed then the company can alert the authorities for prosecution. Alternatively, if a suspect is identified for attempted fraud then the keyboard signatures can be established a pattern of behavior and specific fraudulent attempts. The company could also choose to let a known false transaction go through, and follow the goods or money trail in order to identify the criminal.

Figure 9:
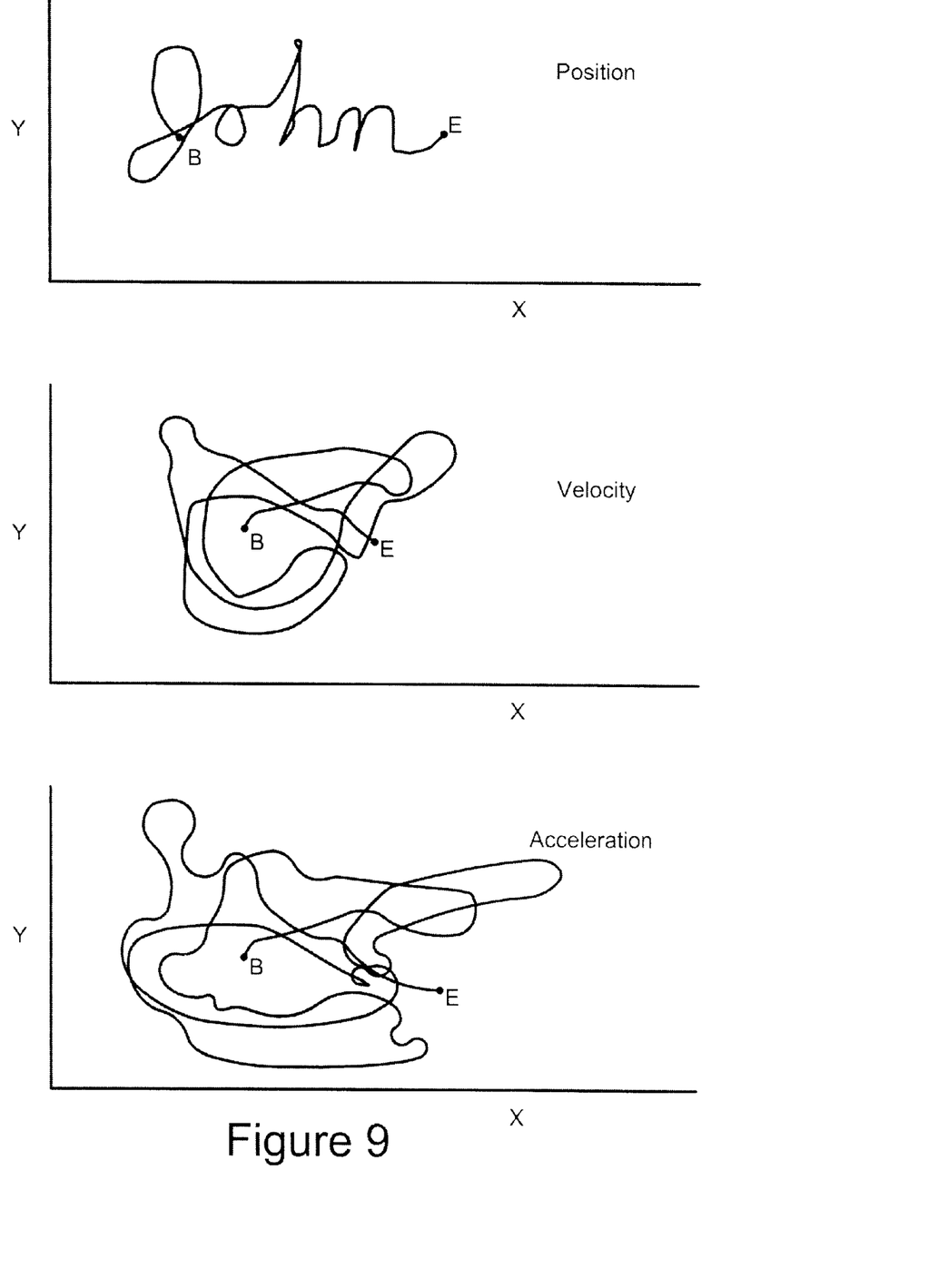
FIG. 9 shows a mouse movement profile.

FIG. 9 shows profiles for a screen signature. This is very useful for computer applications with a mouse. In this application the term "mouse" refers to the broad set of devices for positioning on a computer screen including trackballs and pressure pads for positioning. FIG. 9a depicts the signature of "John". The signature is done in cursive and begins with the letter J beginning at point B and ends at the end point E corresponding to the end of the letter N. The X-Y position plot on the screen is fairly easily forged by tracing a signature sample. However, the velocity profile as shown in FIG. 9b is such that it is impossible to forge. One can trace over the signature to arrive at the position signature as shown in 9a. However, tracing does not give information on the velocity vectors as shown in FIG. 9b as the velocity information is hidden.

Similarly, the acceleration vector is even more dramatically distinct as shown in FIG. 9c. These are easily derived from the position mouse information by simple time differentiation.

As an alternative to having the client sign their name, the system could draw paths on the screen and force the client to follow the paths with the mouse. The accuracy of the path following along with the velocity and acceleration profile would give very good, distinctive information for separation between the legal and false activity. This idea can also be extended to putting words on the screen for the client to match as well as an arbitrary moving pattern that the client would have to follow.

The embodiment of the invention using the neural net, or other detection schema, can be extended to an interactive role. Instead of just relying on passive information such as the day of the week, type, distance from home, the system can be provocative. For example, the system could ask the client to guess the balance of the account, last withdrawal, last date of withdrawal, last transaction details, last deposit, and the amount of the last transaction. These numbers are compared to the actual numbers for accuracy. Perfect accuracy is not required, of course, but scoring systems based on reasonable accuracy can be designed to settle these questions and can be used to enhance the verification decision especially if the keyboard signature security decision is in the gray area.

The ideas of the invention are immediately extendible to the use of a telephone keypad. In this case the transactions are prompted by a voice mail system and the client enters a PIN and other identifiers into the telephone keypad. The keyboard signature and PIN signature acceptance are, of course, easily derived from this invention based on timing. Important data available with the use of a telephone is the phone number transmitted by the Automatic Location Information which is commonly referred to as "Caller ID®". A further advantage of the use of the telephone for a transaction is that the caller ID system may be used to demonstrate that the call is coming in from the client's home. In this case one would assume that the only other user would have been some unusually ambitious burglar and the system takes an immediate identity decision in the positive and bypasses the rest of the approach. In the alternative the fact that there is a caller ID match is used to weight the identification system heavily in favor of the client.

Another embodiment of instant invention is to make it more difficult for the bogus user to imitate the signature of the client. This is done by throwing in irritations on the screen. For example, if the client is giving a very mundane exceptionally consistent signature which may be difficult to distinguish from others then the system make ask irritants such as arbitrary repetitions or pretend to forget some information so the client is forced to re-enter. This would allow the system to store both an irritated and non-irritated signature for the distinction.

Somewhat similarly this system can also put random words on the screen and ask the client to type those random words. This can function as an irritant depending on the words chosen it can also give more opportunities for the client to demonstrate identity beyond just the name and account number by keyboard timing matching.

When using the random words on the screen to force a typing test, words that involve large separations across the keyboard would be mixed in to force two handed typing and finger stretching to exacerbate the differences in typing between two individuals.

A significant aspect of this invention involves the use of collaborative filtering to automatically adjust for the use of different keyboards. (As mentioned earlier, the keyboard is transmitted along with the signature to allow the appropriate acceptance criteria to be used. Alternatively, the customer could be asked to enter the keyboard type or at least describe it. This could be done whenever the putative customer's keyboard signature is not matching well.)

Figure 10:
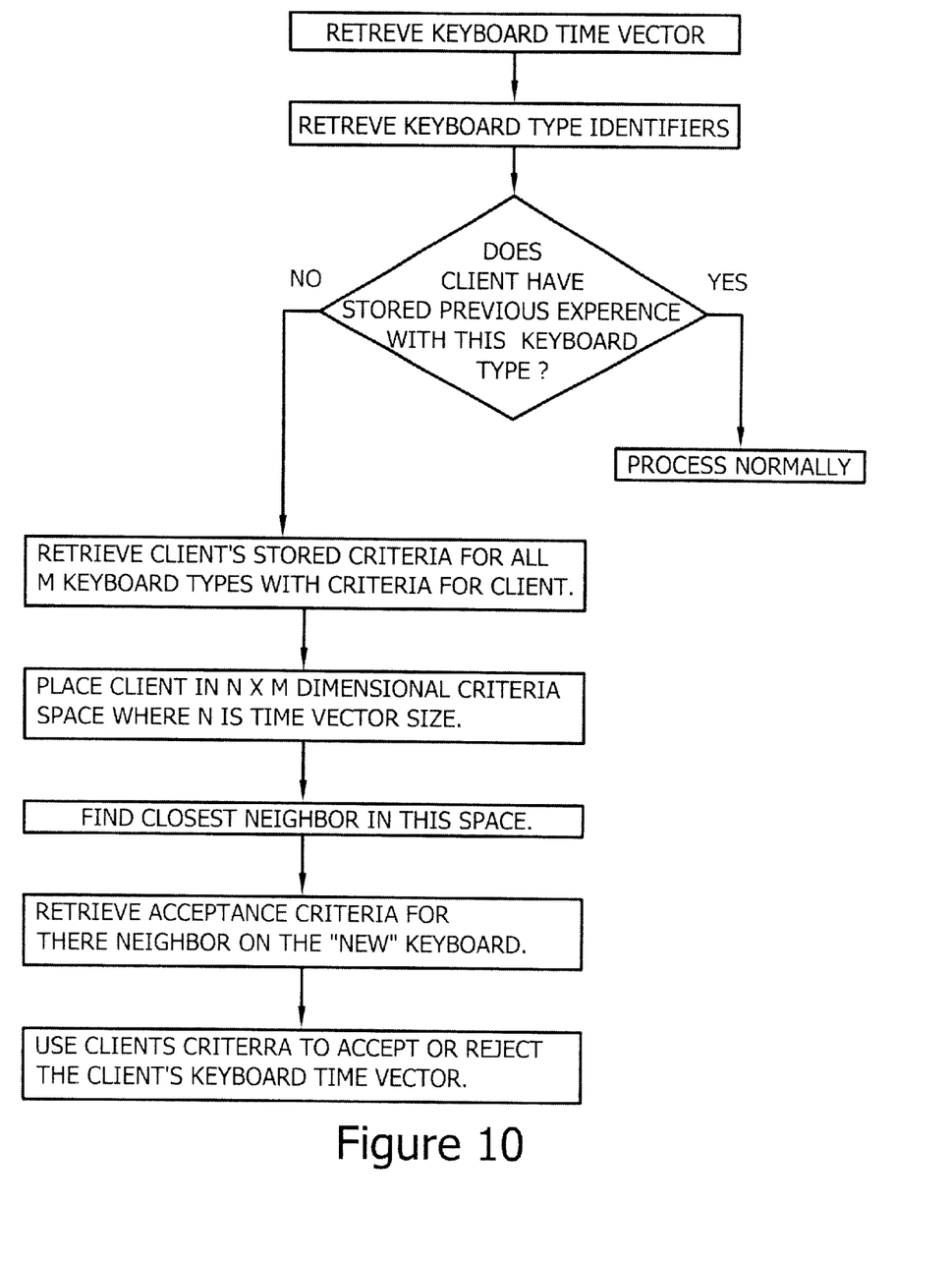
FIG. 10 shows the method for automatic adjustment for different keyboard types.
Figure 11:
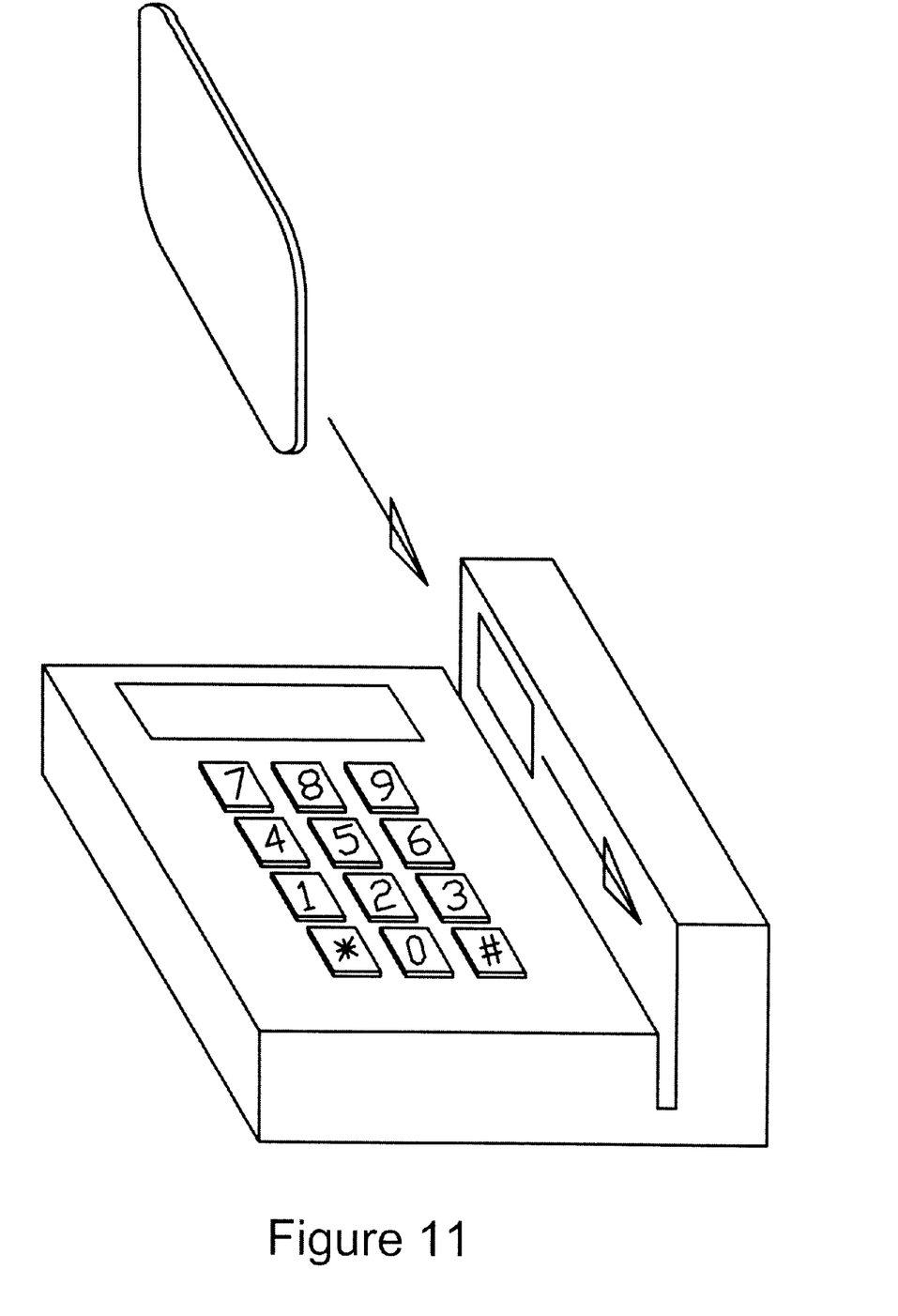
FIG. 11 shows a magnetic card stripe reader.
Figure 12:
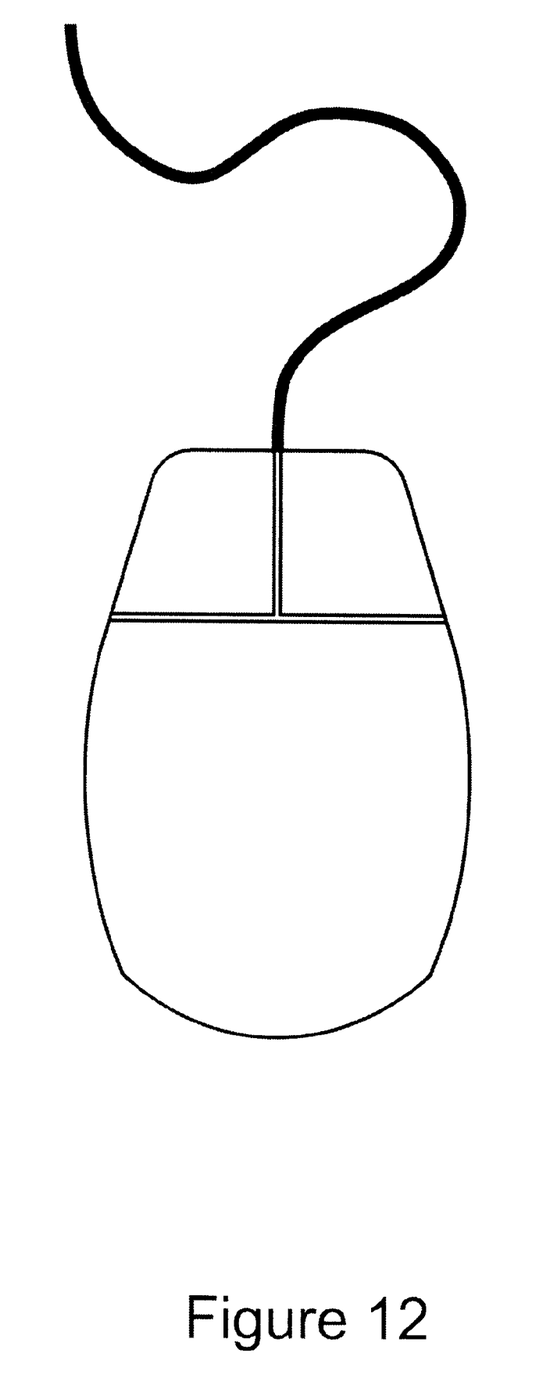
FIG. 12 shows a computer keyboard mouse.

This does not handle the problem in which a client suddenly appears at a new keyboard. This could be a new computer keyboard as the client is attempting to do an E-commerce transaction from work or on the road or it could be a new ATM keyboard. There is a need for a method of modifying the acceptance criteria for a new keyboard even though the client has never used that keyboard. This method is shown in FIG. 10.

The first step is that a system receives the keyboard time vector as discussed earlier. In the next step the system receives the keyboard type identifier which is also discussed earlier.

At the next step the system asks if the client has previous stored experience with this keyboard type. If the answer is in the affirmative then the analysis is processed normally as shown in FIG. 3. If the answer is in the negative then the system goes into a collaborative filtering process to predict what the appropriate signature would be. This is done by retrieving the client's stored criteria for all m keyboard types that already have criteria for this client. In other words if we have stored criteria for m different keyboard types for this client then all of these m are retrieved. In the next step we place the client in an n×m dimensional criteria space where n is the "time" vector dimension. In other words, the client's acceptance criteria are placed in a multi-dimensional Euclidean space for the process.

In the next step the system finds the closest neighbors in this space. These closest neighbors are other clients whose signatures (with the same keyboards) are extremely close to the immediate clients signatures. While there will not be very many of these other clients, there will be enough, in a big system, so that we can predict the signature for the immediate client. The point of finding your closest neighbors is to find individuals with very similar biometrics, including hand size and keystroke speeds.

In the next step we retrieve the acceptance criteria for these neighbors on the "new" keyboard. The bases of using the collaborative filtering here is that individuals that type essentially identically are on the first m keyboard types will have very close signatures on this other keyboard as well. This takes us up to the final step which is to use those criteria to accept or to reject the client's keyboard time vector. In this way we are able to allow or reject the transaction on the new keyboard even it the client had never used the keyboard previously.

An alternative embodiment uses matrix multiplication to deal with the new keyboard problem. In this case the E-commerce provider performs empirical studies to find how typing times vary from one keyboard type to the next.

A matrix transformation is calculated by the known techniques of multiple regression modeling. This produces (assuming a word length n) an m×m matrix for each keyboard pair. So, if a client has the most experience on keyboard type 173, say, and data is coming in on keyboard type 495 then the system retrieves the matrix which will transform keyboard times between these two keyboard types.

Another use of the keyboard idiosyncrasies for identification which gives us 12 choices is based on the method for "entry". In a typical keyboard a client has 4 choices for entry and those are: (1) clicking the mouse and "radio" box, (2) hitting the enter key, (3) hitting the return key, or (4) hitting the tab key. If on the next screen one of these is disabled then there are three remaining choices. The product of this 3 times 4 gives us 12 choices to further confirm the identity of the client. Different individuals have a preference for clicking the mouse versus using a return or tab key and this will further strengthen the identification process. Another technique to further distinguish a client from fraudulent users is to break their cadence with varying requests. I.e., each time the transaction is done one screen might come in a different order from another or the requests will be worded slightly differently or the typing position on the screen is done slightly differently. If a determined fraudulent user attempts to forge the client's signature by repeated attempts with slight variations of typing speed each time these cadence breakers will make that more difficult.

Another issue for the issue of a new keyboard has to do with the client experience with that keyboard. The first time a client uses a keyboard the speed will tend to be lower. After multiple uses the speed will begin to increase. The invention anticipates two methods of dealing with this learning factor. The first is that in a collaborative filtering process the criteria that are used are those that have been established by neighbors also in their early inexperienced use of the same keyboard. The second approach is to scale the speed as experience increases. In other words when the collaborative filter predicts a certain time vector for the new keyboard the first acceptance criteria will increase all of those times slightly to allow for a slower speed and will also widen the acceptance bands around those mean times.

There are additional time metrics that can be derived from the keyboard time vector to give further separations for identification. One of the very useful ones is the percentage of the total time for each element of the vector. For example, considering the example of FIG. 1 of the client entering the PIN number instead of analyzing the times $T_0$ and $T_1 \ldots T_9$ directly the numbers, what would be analyzed would be $T_0$ divided by the total time for the PIN entry and so forth for $T_1$ and etc. This would automatically scale the speed difference while a client is learning a new keyboard. If names are being entered then the data block for total time wold be each name instead of the PIN. Similarly one could analyze the percentage of the median time of all of the numbers as opposed to the total time.

Another comparison embodiment which would rely less on exact timings is to rank the letters of the signature or the numbers in the PIN or a column in order of the downtimes depression times and space times. With this system the total time for the keyboard entry is irrelevant and merely the respective time between the different items.

There can be an issue with short signatures with individuals with very short surnames. $T_0$ increase security these individuals would be encouraged to type at least 10 letters, for example their first name, last name and perhaps a nickname or a friend's name for their signature. This would then be used for the training. The signature could also be padded by simply having the individuals type in their full name twice.

Another element of this invention will allow the customer to choose a favorite name that they find easy to type as a signature basis. If this name is not disclosed then there are two levels of security, the actual identifier name and the typing cadence.

The invention anticipates that spelling mistakes will be ignored. The timing for a spelling mistake is simply treated as if it was the correct letter. The operator is not given a chance to go bask and "fix" the offending letter. Our research has shown that this helps with separation as the correct client is less likely to misspell his or her own name and this gives further separation.

If network security were violated it is possible that someone could obtain the actual keyboard times of a given client. For major fraud these exact numbers could be faked in from a remote computer and entered as if they were the signature by simply interposing them in the appropriate data stream. While this would require a fair bit of sophistication on the part of the criminal it is conceivable. The instant invention anticipates a solution to this. For very high security transactions the client would be required to type in the name 4 times and the system will look for a given variance between the names. In other words, if the keyboard signature is excessively stable then the system will reject it. The system will also look for a given level of variance among the key space times and key depression times for each letter of the name. This is because the human is not that consistent in typing even their own name. A computer fraud would have to anticipate not only the actual numbers but predict the amount of variance that the client typically has.

A slight simplification of this procedure for matching variances, is to not require the client to submit their name multiple times but merely to verify that the keyboard signature has some variance from the previous transaction. If there was a perfect match on the last transaction then the signature would be rejected.

I claim:

1. A method of processing automatic teller machine transactions comprising the steps of:
   measuring the timing parameters associated with the customer's interactions with the machine,
   transmitting the timing parameters to an analysis site,
   transmitting transaction details to the analysis site,
   comparing the timing parameters to a stored reference,
   comparing the transaction details to the customer's typical habits, and
   using the results of both comparisons to make a decision as to whether or not to handle the transaction in a normal manner.

2. The method of claim 1 in which the distance of the ATM machine to the customer's home is considered as a transaction detail in the acceptance decision.

3. The method of claim 1 in which the time of day of the transaction is considered as a transaction detail in the acceptance decision.

4. The method of claim 1 in which the day of the week of the transaction is considered as a transaction detail in the acceptance decision.

5. The method of claim 1 in which the customer is asked to estimated the parameters of previous transactions and the accuracy of those estimates is used in the acceptance decision as a transaction detail.

6. A method of processing electronic transactions involving a telephone comprising the steps of:
- measuring the timing parameters associated with the customer's interactions with the telephone keypad,
- transmitting the timing parameters to an analysis site,
- comparing the timing parameters to stored references which have acceptance criteria, and using the results of the comparison to make a decision as to whether or not to handle the transaction in a normal manner.

7. The method of claim 1 in which the automatic location information from the phone is weighed in the acceptance decision.

8. A method of processing electronic transactions comprising the steps of:
- giving the customer variable commands requiring keyboard interaction,
- measuring the timing parameters associated with the customer's interactions with the keyboard,
- transmitting the keyboard timing parameters to an analysis site
- comparing those parameters to a stored reference which has acceptance criteria, and p1 using the results of this comparison to make a decision as to whether or not to handle the transaction in a normal manner.

9. The method of claim 8 in which the variable commands are demands that the customer enter at least one apparently random word.

10. The method of claim 8 in which the variable commands are demands designed to cause stress in the customer.

11. A method of processing electronic transactions comprising the steps of:
- measuring the timing parameters associated with a customer's
- interactions with a keyboard,
- transmitting the keyboard type to an analysis site,
- transmitting the timing parameters to an analysis site,
- noting if the keyboard type is one with which the customer has minimal experience,
- using collaborative filtering to help establish acceptance criteria in the case of minimal experience,
- comparing the transmitted keyboard timing parameters to the acceptance criteria, and
- using the results of this comparison to make a decision as to whether or not to handle the transaction in a normal manner.

12. A method of processing electronic transactions comprising the steps of:
- measuring the timing parameters associated with a customer's interactions with a keyboard,
- transmitting the timing parameters to an analysis site,
- noting if the keyboard type is one with which the customer has minimal experience,
- adjusting the stored acceptance criteria to establish new temporary acceptance criteria in the case of minimal experience to adjust for the customer's learning time with the new keyboard,
- comparing the transmitted keyboard timing parameters to the acceptance criteria, and
- using the results of this comparison to make a decision as to whether or not to handle the transaction in a normal manner.

13. A method of processing electronic transactions comprising the steps of:
- measuring the timing parameters associated with a customer's interactions with a keyboard,
- transmitting the timing parameters to an analysis site,
- comparing the transmitted keyboard timing parameters to stored acceptance criteria,
- using the results of this comparison to make a decision as to whether or not to handle the transaction in a normal manner, and
- storing rejected keyboard signature entries for possible prosecution assistance.

14. A method of processing electronic transactions comprising the steps of:
- measuring the timing parameters associated with a customer's interactions with a keyboard,
- transmitting the timing parameters to an analysis site,
- noting the key which the customer uses for the "enter" command,
- comparing the transmitted keyboard timing parameters to stored acceptance criteria,
- comparing the key used for the "enter" command to the customer's previous experience, and
- using the results of both comparisons to make a decision as to whether or not to handle the transaction in a normal manner or not.

15. A method of processing electronic transactions comprising the steps of:
- measuring the timing parameters associated with a customer's interactions with a keyboard,
- transmitting the timing parameters to an analysis site,
- processing the transmitted keyboard timing parameters to transform them each into a percentage value of the total keyboard entry time for the appropriate data block entered,
- comparing the percentage values to stored acceptance criteria, and
- using the results of the comparison to make a decision as to whether or not to handle the transaction in a normal manner.

16. The method of claim 15 in which the keyboard timing parameters are transformed into a rank ordering instead of into a percentage of the total time.

17. A method of processing electronic transactions comprising the steps of:
- measuring the timing parameters associated with the customer's interactions with a keyboard,
- transmitting the timing parameters to an analysis site,
- calculating a measure of the variability in the timing parameters,
- comparing those parameters to a stored reference which has acceptance criteria,
- comparing the variability in the timing parameters to other acceptance criteria, and
- using the results of both comparisons to make a decision as to whether or not to handle the transaction in a normal manner.

* * * * *